US006704168B1

(12) United States Patent
Michael et al.

(10) Patent No.: US 6,704,168 B1
(45) Date of Patent: Mar. 9, 2004

(54) AIR VANE ACTUATOR LATCH WITH A PORTION OF A VANE PORTION BETWEEN STORAGE DISK EDGE AND HOUSING SIDEWALL

(75) Inventors: David Michael, Auburndale, MA (US); Larry E. Wittig, Lexington, MA (US); William D. Robertson, Charlton, MA (US); Joaquim A. Bento, Franklin, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/280,422

(22) Filed: Mar. 29, 1999

(51) Int. Cl.⁷ ............................. G11B 5/54; G11B 21/22
(52) U.S. Cl. .................................. 360/256.1; 360/256.2
(58) Field of Search ............................... 360/256.1, 256, 360/256.3, 256.2

(56) References Cited

U.S. PATENT DOCUMENTS

| 5,036,416 | A | * | 7/1991 | Mastache ............... 360/256.1 |
| 5,319,511 | A |   | 6/1994 | Lin |
| 5,555,146 | A | * | 9/1996 | Hickox et al. |
| 5,602,700 | A |   | 2/1997 | Viskochil et al. |
| 5,668,683 | A |   | 9/1997 | Stone |
| 5,717,544 | A |   | 2/1998 | Michael |
| 5,734,527 | A | * | 3/1998 | Reinhart |
| 5,768,057 | A | * | 6/1998 | Fernandes et al. |
| 5,793,572 | A | * | 8/1998 | Lalouette et al. |
| 6,108,162 | A | * | 8/2000 | Amirkiai et al. ......... 360/97.01 |
| 6,462,912 | B1 | * | 10/2002 | Pasupathy et al. ....... 360/256.1 |

FOREIGN PATENT DOCUMENTS

WO    WO 9726654 A1 * 7/1997 ........... G11B/17/02

\* cited by examiner

*Primary Examiner*—Craig A. Renner
(74) *Attorney, Agent, or Firm*—James P. Broder; Steven G. Roeder

(57) ABSTRACT

An actuator latching mechanism for a disk drive device is provided. The latching mechanism includes a rotatable body portion, a rigid air vane portion and a latching arm. When a data storage disk of the disk drive is not being rotated, the latching mechanism maintains a transducer actuator assembly of the disk drive in a locked position by engaging the transducer actuator assembly in the latching arm. When the data storage disk is rotated, airflow is generated proximate to the surface of the disk, in the same direction in which the disk is rotated. The latching mechanism is disposed in a space between the edge of the data storage disk and a side wall of the housing so that the peripheral effects of the airflow exerts a force on the air vane portion, rotating the latching mechanism towards the side wall to release the actuator assembly from the latching arm. Once disk rotation stops, the air vane portion returns to its original position and the latching arm engages the actuator assembly in the locked position.

16 Claims, 8 Drawing Sheets

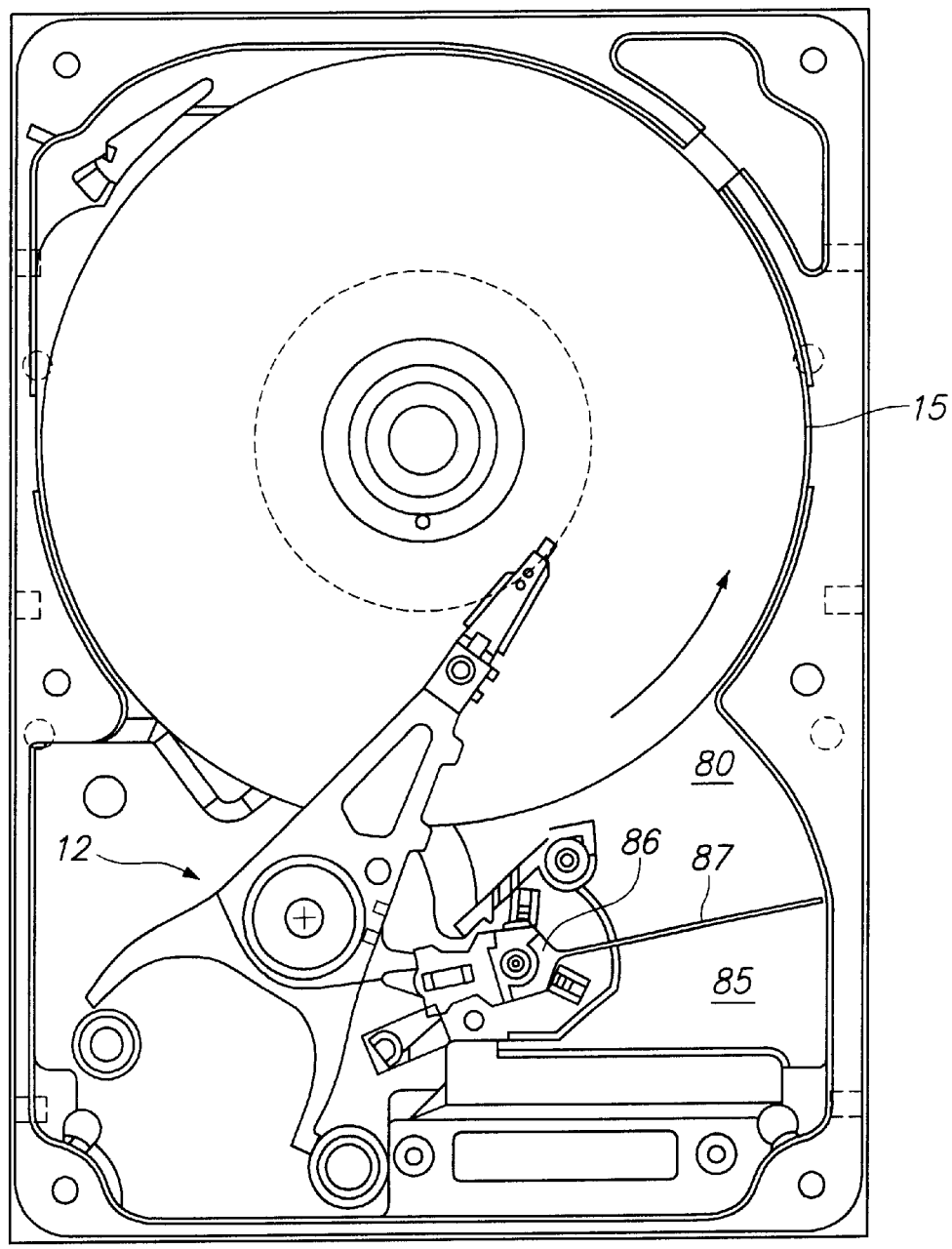
FIG. 3a *(Prior Art)*

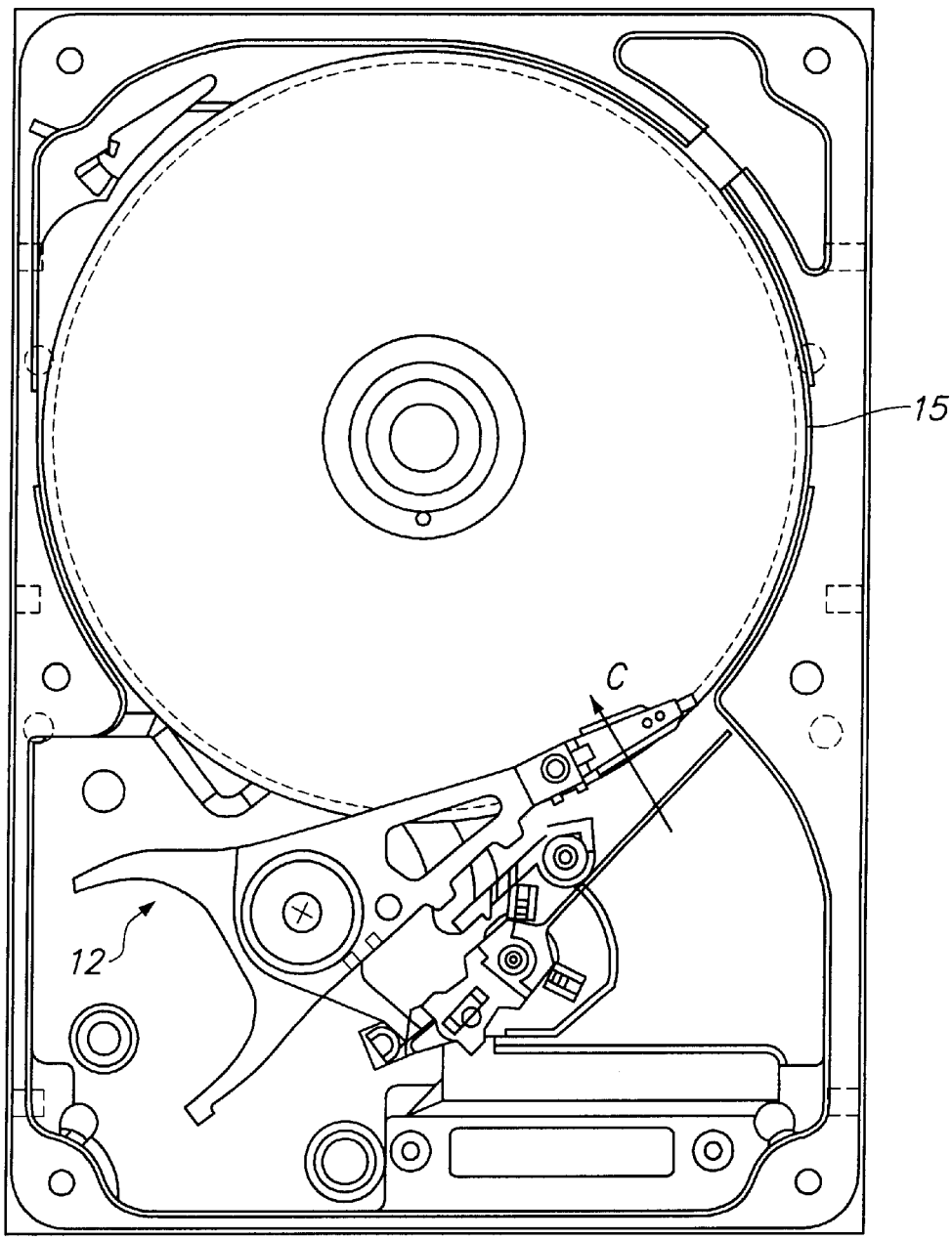
FIG. 3b *(Prior Art)*

AIR VANE ACTUATOR LATCH WITH A PORTION OF A VANE PORTION BETWEEN STORAGE DISK EDGE AND HOUSING SIDEWALL

FIELD OF THE INVENTION

The present invention relates to an apparatus and method for releasably locking an transducer actuator assembly at a fixed position relative to a disk. More particularly, the present invention relates to an improved apparatus and method for releasably locking an actuator assembly.

BACKGROUND OF THE INVENTION

The assignee of the present invention has pioneered the concept of an aerodynamically released actuator latch for hard disk drive. By way of example, the reader's attention is directed to commonly assigned U.S. Pat. No. 4,538,193 for "Aerodynamically Released Safety Latch for Data Transducer Assembly in Rotating Rigid Disk Data Storage Device". The disclosure of the referenced patent is incorporated herein by reference. The reader's attention is further directed to U.S. Pat. No. 5,319,511 for "Aerodynamic Actuator Latch with Magnetic Return Spring for Hard Disk Drive" and U.S. Pat. No. 5,717,544 for "Pressure Differential Latch for a Disk Drive". The disclosures of the referenced patents are also incorporated herein by reference.

Aerodynamically released shipping latches of the type described in the referenced patents have proven very successful in operation. The distinct advantages of an aerodynamically released shipping latch and its manner of operation are explained in these prior patents. Several drawbacks of aerodynamically released shipping latches in accordance with the inventions described in the cited patents have remained unsolved until the present invention. One drawback is associated with the type of latch shown in FIG. 1a. As shown, an air vane portion of this type of latch extends above, below and/or in between the disks when the latch is engaged with the actuator assembly 12, which is parked in a landing zone 14 when the disks 15 are not rotating. In the magnified view of FIG. 1b, it can be seen that a latching arm 32 engages a latching extention 12a of actuator assembly 12, thereby preventing the actuator from rotating away from the landing zone 14. Referring to FIGS. 2a and 2b, as the disk drive powers on and the disks 15 rotate, a resultant airflow impinges upon the air vane portion 11, forcing the latch 16 to rotate in a clockwise direction to disengage from the actuator assembly 12 as the actuator assembly 12 also rotates in a clockwise direction away from the landing zone 14 and onto the data zone 17. Accordingly, this type of shipping latch is susceptible to disengagement by a rotary shock that causes the latch and actuator to rotate in the clockwise direction, resulting in possible damage to the disk surface, transducer head and data zone. Another drawback of this design is that the air vane portion, which extends into the airflow generated by the rotating disk, causes aerodynamic drag, which increases the power consumption of the drive. Since aerodynamic drag is proportional to the square of velocity, this is a particular concern for high speed drives e.g. 10,000 rpm.

Another drawback is associated with the type of latch shown in FIG. 3a, which shows the latch 86 in a latched position. As shown, this type of latch is positioned "downstream" of the actuator assembly 12. The forces that operate this type of latch is created as the actuator assembly partially blocks a portion of the airflow generated by the disk rotation. This creates a difference in air pressure between the regions 80 and 85 as shown in FIG. 3a. As the disk 15 rotates, the pressure difference integrated over the air vane portion 87 overcomes a bias mechanism (not shown) to rotate the latch in the direction, indicated by arrow C, disengaging itself from the actuator, as illustrated in FIG. 3b. This type of latch occupies space that may also be needed to route a flex circuit. Because of the lack of overall space within a disk drive, and the lack of alternative positions to locate the flex circuit, positioning a latching mechanism downstream from the actuator assembly makes routing the flex circuit cumbersome and time consuming. Another drawback of this type of latch is that it requires an arm attached to the actuator, which increases inertia and cost and is susceptible to vibration.

Thus, there exists a need for an improved, simple and cost efficient latching mechanism which can effectively use the airflow generated by a spinning disk, which does not require increased power use and is not susceptible to rotary shock.

SUMMARY OF THE INVENTION

The latching mechanism of the present invention satisfies these needs.

A general object of the present invention is to provide a latching mechanism for a transducer actuator assembly of a disk drive assembly which overcomes the limitations and drawbacks of the prior art latching devices.

A more specific object of the present invention is to provide a latching mechanism utilizing a single rigid air vane positioned in close proximity to the rotating data storage disks, which is deflected to rotate in a counter clockwise direction and to release a transducer actuator assembly by diverted airflow within a disk drive assembly. In an open position, the latching mechanism blocks airflow generated by the spinning disk, thereby creating an area of static high pressure. This static high pressure maintains the latching mechanism in the unlocked position until the disk stops spinning.

BRIEF DESCRIPTION OF THE DRAWINGS

These and other objects, advantages and features of the present invention will be better understood and appreciated upon consideration of the following detailed description, appended claims and accompanying drawings of a preferred embodiment, where:

FIG. 1b shows a magnified view of a detailed area of the disk drive of FIG. 1a.

FIG. 2b shows a magnified view of a detailed area of the disk drive of FIG. 1a.

FIG. 3a shows a top plan view of a disk drive showing another latching mechanism of the prior art in the locked position.

FIG. 3b shows a top plan view of the disk drive of FIG. 2a showing the latching mechanism in the unlocked position.

FIG. 5b shows a magnified view of the detailed area of the latch member of FIG. 5a.

DETAILED DESCRIPTION OF A PREFERRED EMBODIMENT

Figure 1A:
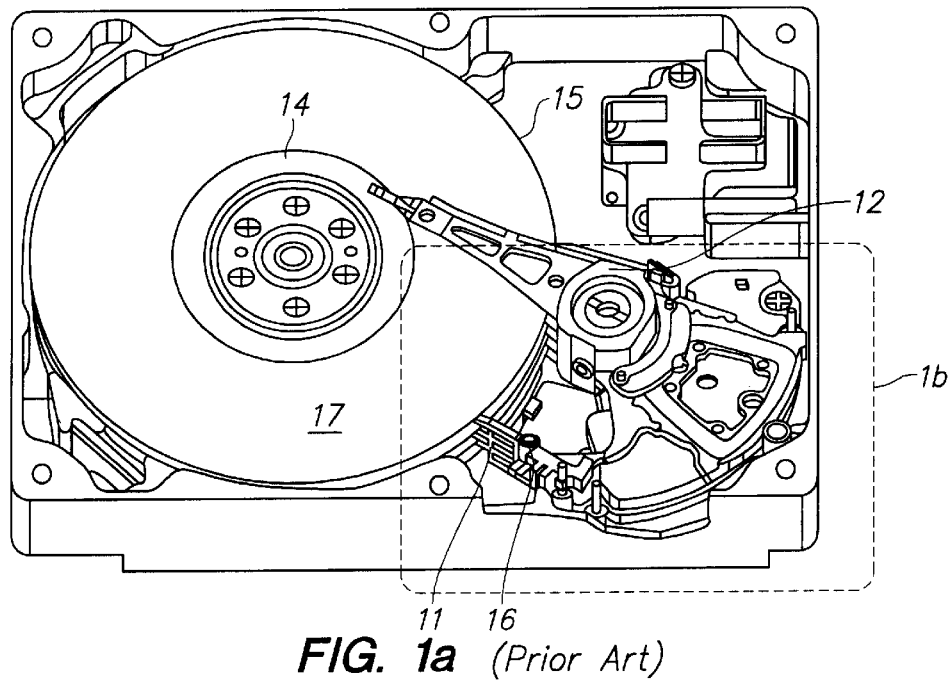
FIG. 1a shows a top plan view of a disk drive showing a latching mechanism of the prior art in the locked position.
Figure 1B:
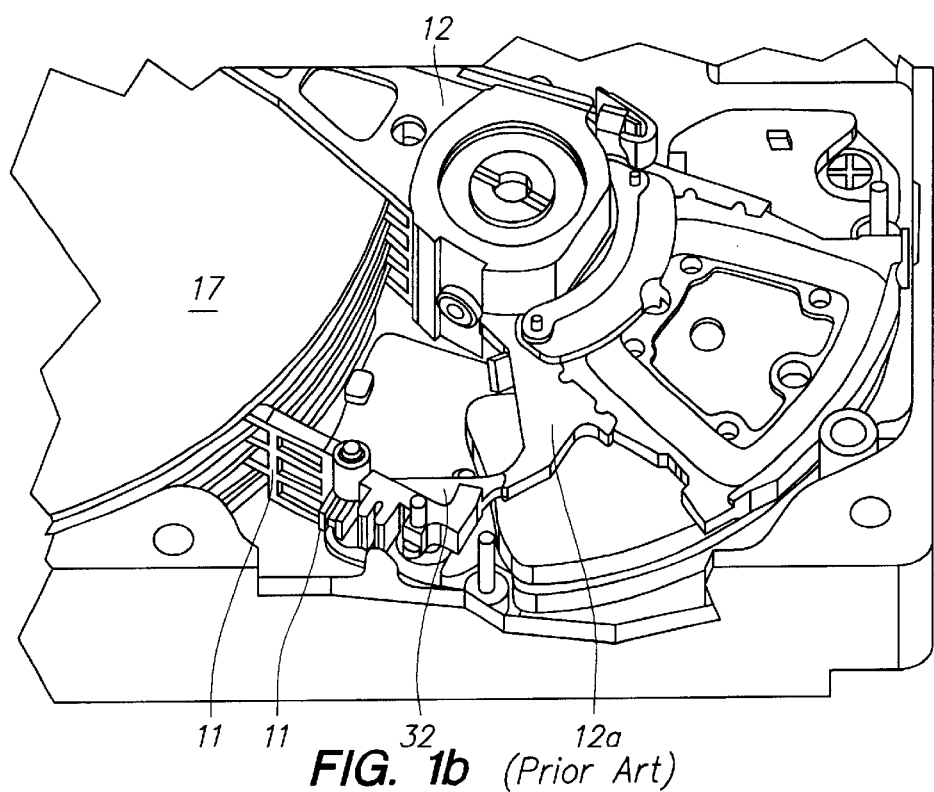
Figure 2A:
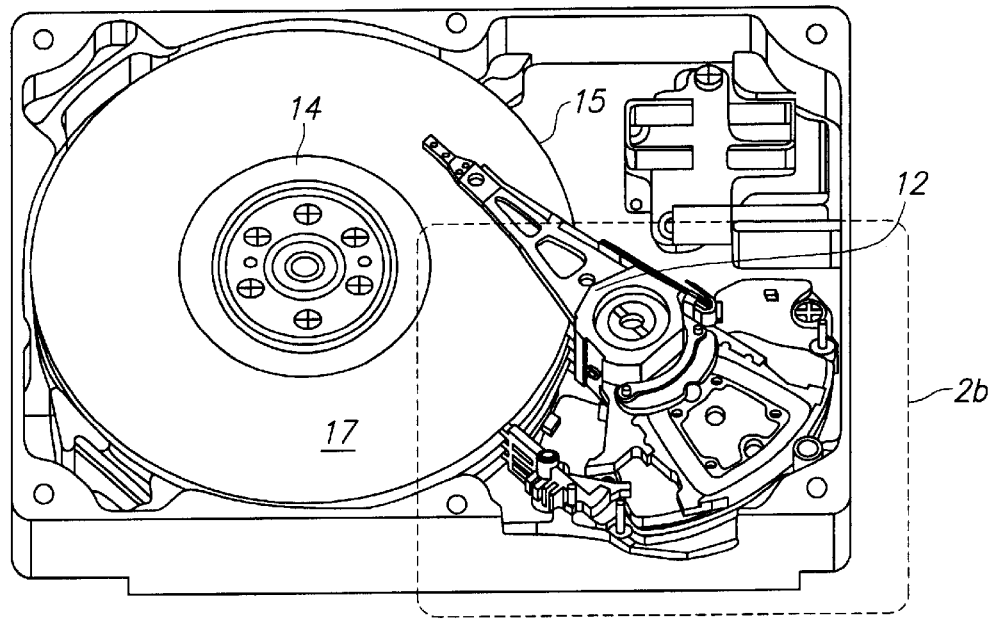
FIG. 2a shows a top plan view of a disk drive showing a latching mechanism of the prior art in the unlocked position.
Figure 2B:
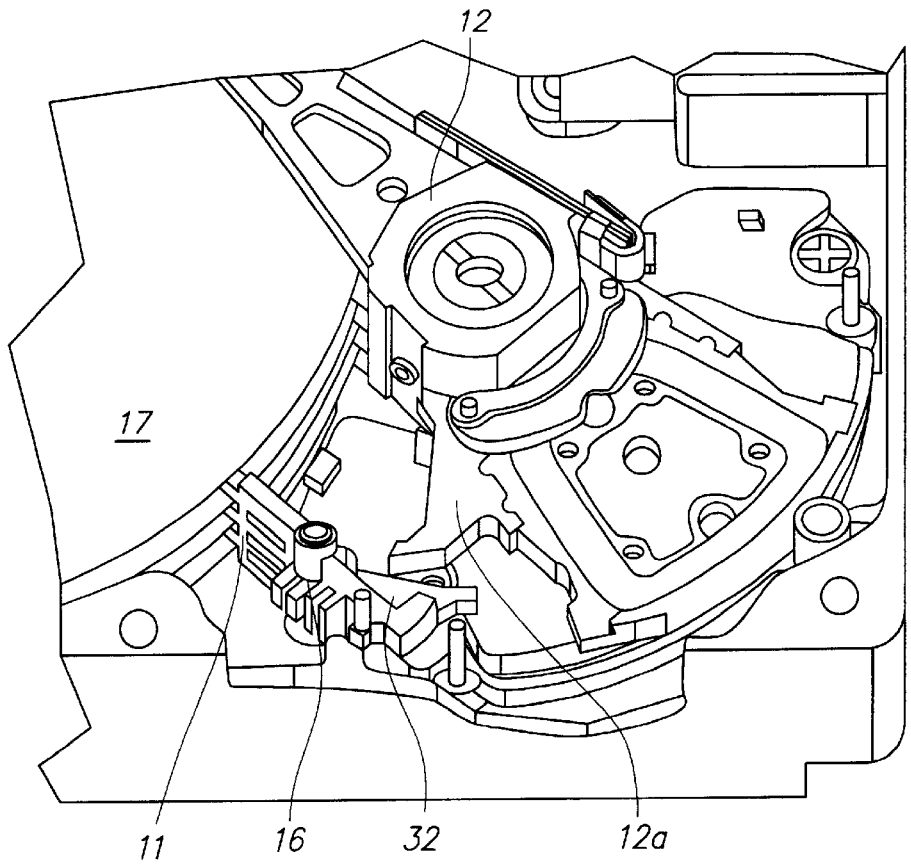
Figure 4A:
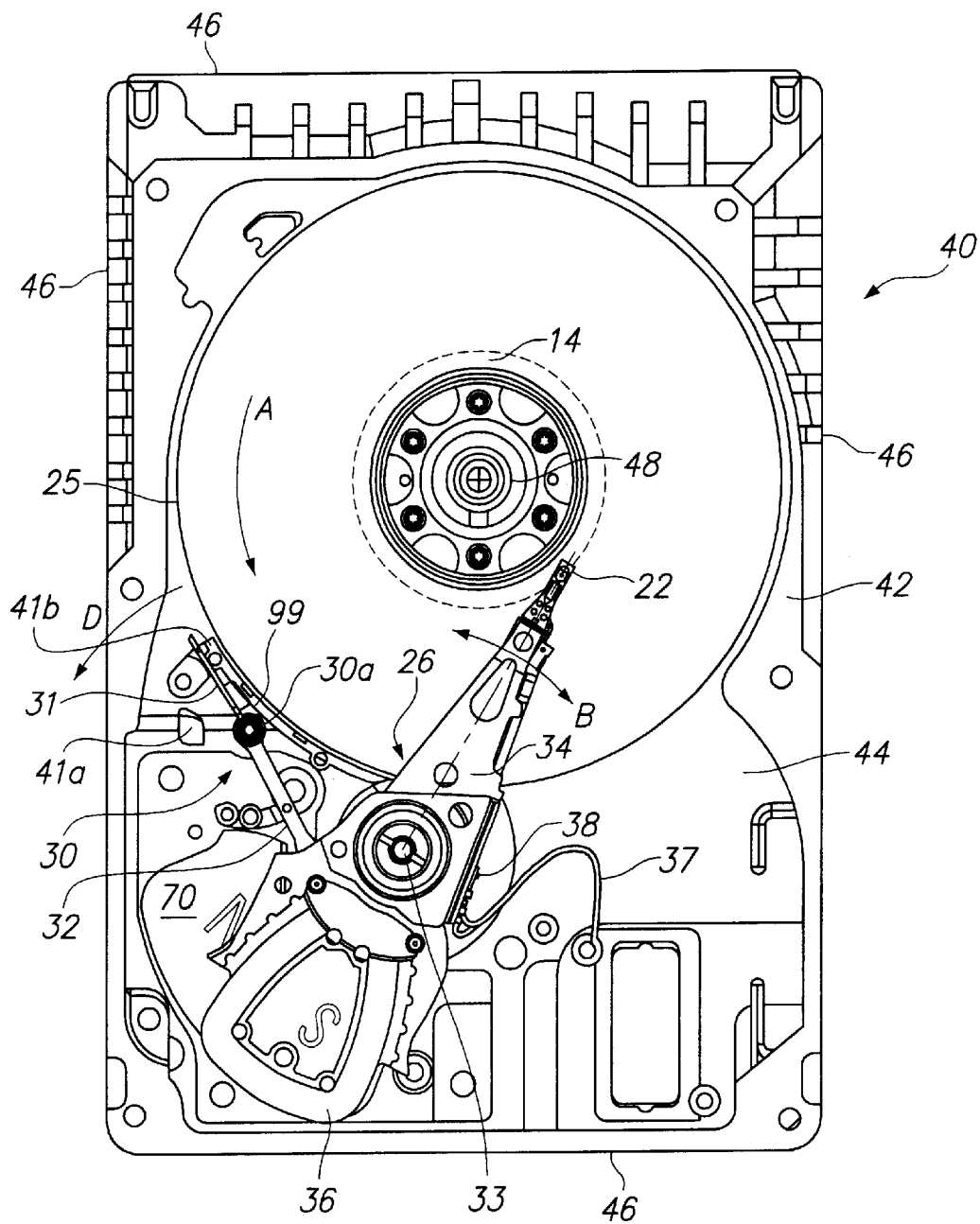
FIG. 4a shows a top plan view of a disk drive in accordance with the present invention, showing a latching mechanism in the locked position.
Figure 4B:
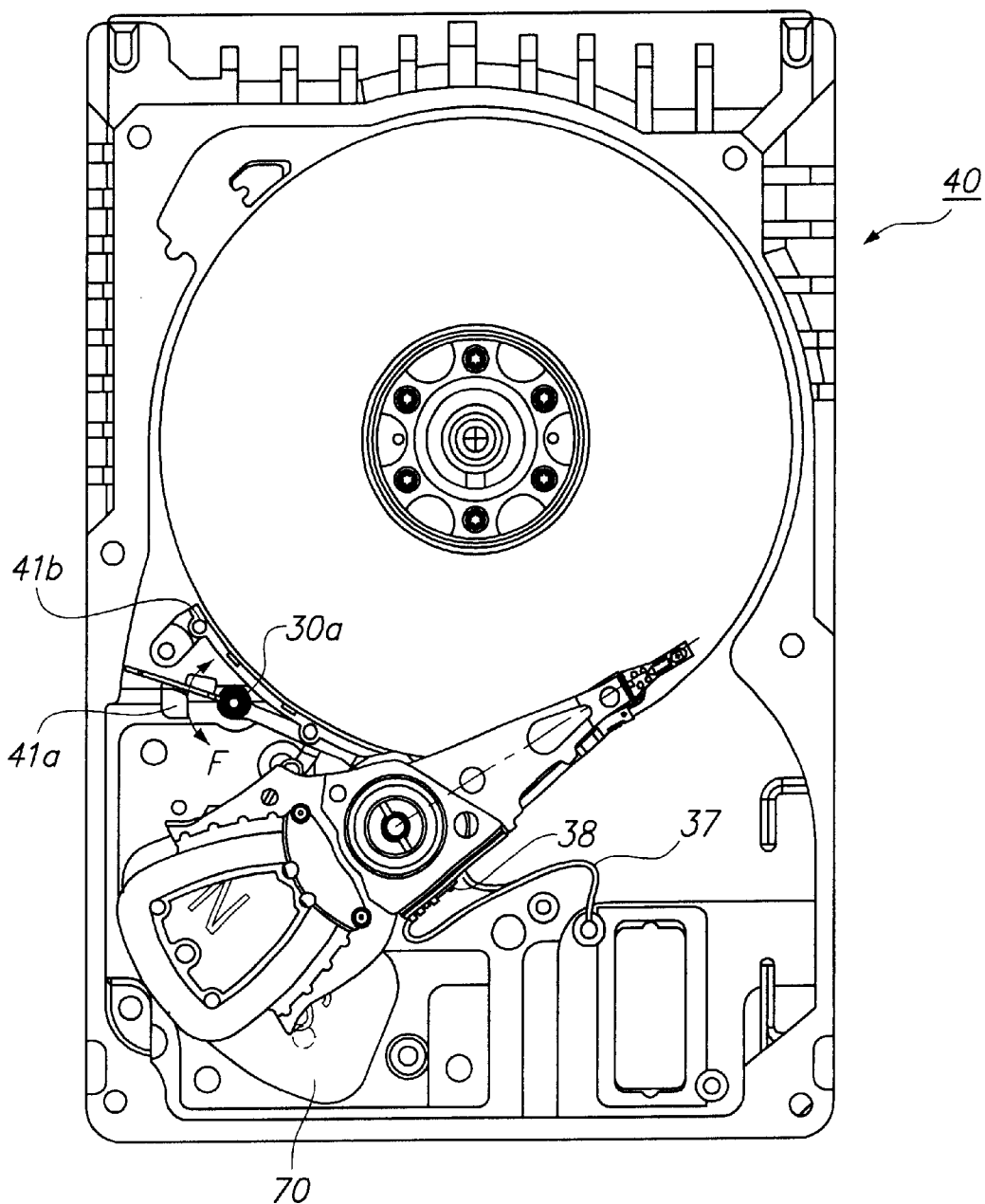
FIG. 4b shows a top plan view of the disk drive of FIG. 3a, showing the latching mechanism in the unlocked position.

Referring to FIGS. 4a and 4b, a disk drive assembly 40 including a latching mechanism 30 which incorporates principles of the present invention is shown. The disk drive 40 is contained within a housing 42 which includes a base 44, integrally connected sidewalls 46, and a cover (not shown). The combination of the base 44, sidewalls 46 and cover defines an interior space in which the disk drive 40 is disposed. The disk drive 40 includes a spindle or hub 48 having an axis of rotation, at least one data storage disks 25 rotatably mounted to the spindle 48, and a transducer actuator assembly 26. Typically, a brushless spindle motor (not shown) is coupled to the spindle 48 for rotating the data storage disks 25 at a predetermined angular velocity. The spindle motor is typically integrated into the hub 48 that supports the data storage disks 25, such that the spindle motor supports and directly rotates the storage disks 25. The data storage disks 25 are rotated in a counterclockwise direction, as indicated by arrow A, about the axis of rotation.

The data storage disks 25 can have a single surface, or both an upper and lower surface, on which data is stored. Typically, the surface of the disks 25 are coated, plated or deposited with a suitable magnetic material, such as ferrous oxides. However, the storage medium can also be optical, magneto-optical, and the like.

The transducer actuator assembly 26 is bidirectionally rotatably journalled to the base 44 of the housing 42 about an axis of rotation. The transducer actuator assembly 26 can rotate bidirectionally along a path of approximately 30 degrees, as indicated by arrow B. The transducer actuator assembly 26 includes a transducer assembly 22, a carriage or support arm assembly 34, and an actuator voice coil motor 36, including permanent magnet 70. The transducer actuator assembly 26 can be a rotary or linear-type assembly.

The transducer assembly 22 is attached to a first end of the carriage assembly 34 in a conventional manner, and the voice coil motor 36 is attached to a second end of the carriage assembly 34 by adhesive or by intergral molding thereto. The carriage assembly 34 is mounted to the base 44 by a journal 33 about which the transducer actuator assembly 26 rotates. The journal 33 is disposed adjacent to a peripheral edge of the data storage disks 25 such that the carriage 34 and transducer assembly 22 extends over the surface of the disks 25. Activation of the actuator voice coil motor 36 rotates the transducer actuator assembly 26 about the journal 33 and accurately positions the transducer assembly 22 over concentric data tracks on the surface of the data storage disks 25, to allow read/write transducers (not specifically shown) access to stored data.

A conventional transducer assembly 22 includes a read/write transducer (not shown) formed on an air bearing slider, and a load beam. The load beam is preloaded to bias the slider toward the surface of the disks 25 such that when the disks 25 are not rotating, the transducer rests on the surface of the disks 25. Alternatively, when the disks 25 are rotating, the slider-transducer overcomes the load beam preload force and "flies" just above the surface of the disks 25 on an air bearing or cushion in accordance with conventional Winchester disk principles. During flight, the transducer actuator assembly 26 rotates relative to the surface of the disks 25, as indicated by arrow B, to position the transducer over the necessary data tracks. When the actuator voice coil motor 36 is deactivated, the transducer assembly 32 must be positioned to a parking or landing zone 14 where they will not damage the surface of the disks 25. Typically, the landing zone 14 is an inner annular region of the disks 25 proximate to the spindle hub 48. The latching mechanism 30 of the present invention locks the transducer actuator assembly 26 as the transducer assembly 22 comes to rest in the landing zone 14.

Disk drive 40 also includes a flexible circuit 37 that carries conductive traces to the transducer heads and to the rotary voice coil motor 36. The flex circuit also carries and connects a read amplifier, write driver and head select integrated circuit 38, which is placed in close proximity to the transducer heads as shown in FIG. 4a.

Figure 5A:
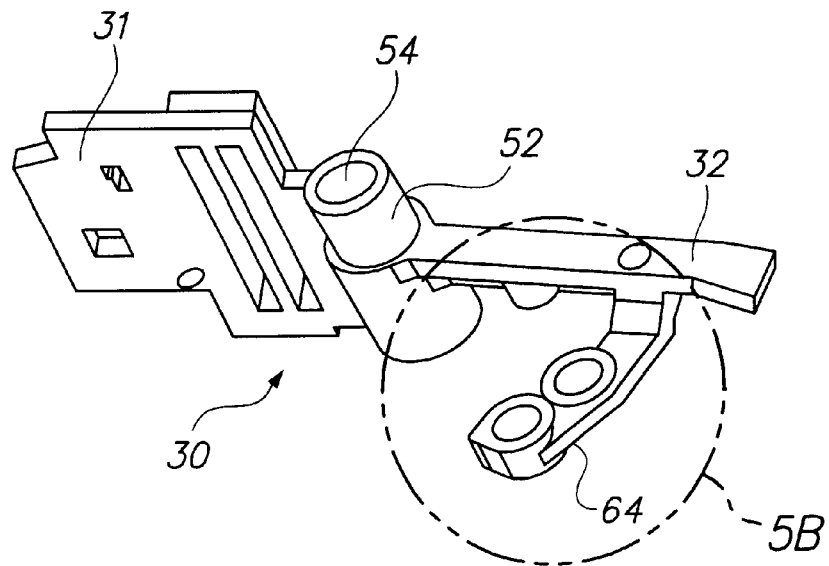
FIG. 5a shows a plan view of an embodiment of a latch member of the present invention.
Figure 5B:
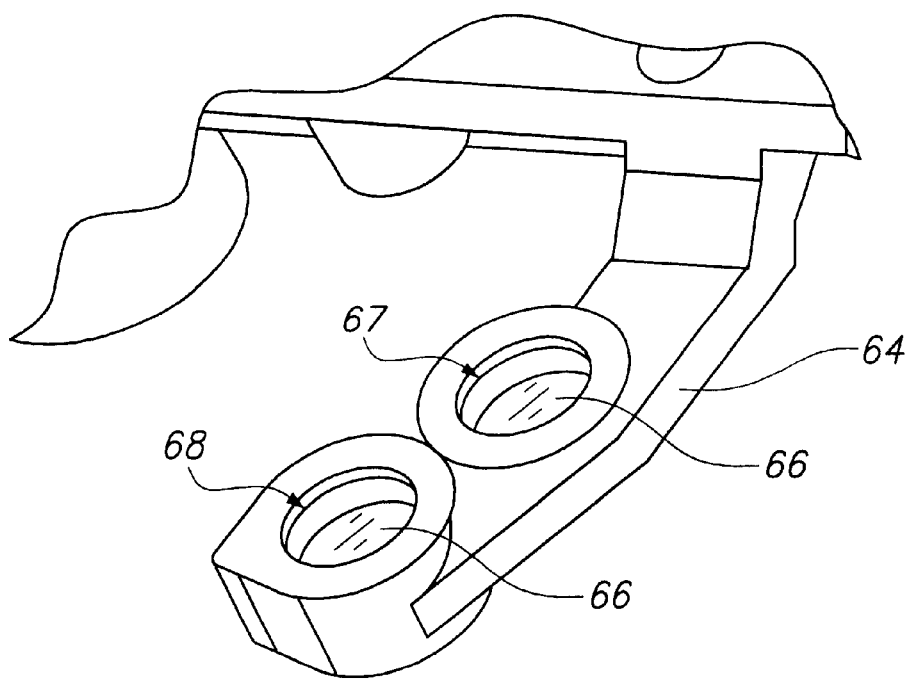

The latching mechanism 30 of the present invention is presented in FIGS. 5a and 5b and generally comprises a shaft 30a or post fixed to the base 44 of the housing 42, with a latching mechanism 30 rotatably disposed on the shaft 30a. The shaft 30a has a cylindrical shape and is preferably fabricated out of stainless steel, or any other suitably strong, rigid plastic material.

Referring to FIGS. 5a and 5b, the latching mechanism 30 comprises a body portion 52, a rigid air vane portion 31 and a latching arm 32. The latching mechanism 30 is preferably formed from a liquid crystal polymer, or other suitably formable rigid, low friction material. The body portion 52 of the latching mechanism 30 has a hollow cylindrical core 54 sized to accommodate the shaft 30a so that the shaft 30a engages the latching mechanism 30 to allow rotation of the latching mechanism 30. The body portion 52 is disposed on the shaft 30a and is rotatable about the shaft 30a in a bidirectional manner, as indicated by arrow F in FIG. 4b. Preferably, the latching mechanism 30 rotates bidirectionally in a limited range of movement of about 35 degrees, as measured from the locked position.

In the version of the latching mechanism 30 shown in FIGS. 5a and 5b, the air vane portion 31 of the latching mechanism 30 comprises a rectangular shaped plate extending from the body portion 52 in a direction opposite to that which the latching arm 32 extends. The vane portion 31 is shaped and sized to have a surface area upon which an area of static high pressure generated by rotation of the data storage disks 25 acts. The action of the peripheral effects from the disk airflow against the vane portion 31 creates a force that acts sufficiently to create a torque, causing the latching mechanism 30 to be rotated about the shaft. The vane portion 31 extends to within a predetermined distance of the sidewall 46 of the housing 42, to minimize diversion of airflow around the surface of the air vane portion 31, thereby maintaining the area of static high pressure against the vane portion 31. (The area of static high pressure area will be explained in more detail herein below.) Preferably, the vane portion 31 extends to within about 0.8 to about 1.2 mm of the sidewall 46 of the housing 42. In an embodiment of the present latching mechanism 30 used in a disk drive 40 with 3.0 inch diameter data storage disks 25, the air vane portion 31 preferably extends about 15.0 mm from the center of the body portion 52, has a vertical height of about 14 mm, and a width of about 0.6 mm.

Referring to FIGS. 5a and 5b, the latching arm 32 extends from the body portion 52 of the latching mechanism 30 in a direction opposite to that of the air vane portion 31. The latching arm 32 includes a magnetic biasing arm 64 extending arcuately from the latching arm, from a location proximate the latching end of the latching arm 32. The magnetic biasing arm 64 includes openings 67 and 68 for securely housing ferromagnetic members 66. Ferromagnetic members 66 e.g. steel ball bearings, may be secured to openings 67 and 68 to create a magnetic bias towards the fringes of the magnetic field from permanent magnet 70 as shown in FIG. 4a and 4b, thereby biasing the latching mechanism 30 back to a closed position when the disk stops rotating. The ferromagnetic members 66 may be secured within openings 67 and 68 by press fit, with suitable adhesives or other known methods. Either one or both openings may be fitted with ferromagnetic members, 66 depending on the amount of bias necessary for each particular application. Alternatively, the magnetic biasing arm 64 could be replaced by a mechanical spring.

The body portion 52, air vane portion 31, latching arm 32 and magnetic biasing arm 64 of the latching mechanism 30 can be integrally formed or molded as a single unit. Alternatively, the pieces can be fabricated separately and joined in any conventional manner, such as with adhesives or screws.

The latching mechanism 30 of the present invention can additionally include stops 41a and 41b as shown in FIGS. 4a and 4b. Stop 41b is positioned in a space between the peripheral edge of the data storage disks 25 and the air vane portion 31 of latching mechanism 30. In one embodiment, stop 41b is integrated with a latch baffle 99. However, it should be understood that stop 41b may also comprise a member fixed to the base 44. The stop 41b is shaped and sized to stop the deflected air vane portion 31 from rotating into contact with the data storage disks 25. Stop 41a is disposed in a space between the air vane portion 31 of latching mechanism 30 and the side wall 46, as illustrated in FIG. 4a and 4b. In one embodiment, stop 41a is integrally formed and extends from the housing 42. Stop 41a is shaped and sized to stop the air vane portion 31 from rotating into contact with the side wall 16. Alternatively, stop 41a may also be provided by plastic or metallic members journalled or attached to the base 44.

As shown in FIGS. 4a and 4b, the latching mechanism 30 of the present invention is located at an "upstream" position relative to the actuator assembly. The upstream reference is based on the direction of airflow generated by the rotating disks 25, which rotates in the direction of arrow A. It is evident that locating the latching mechanism 30 on a "downstream" position would physically interfere with the flex circuit 37 and integrated circuit 38 which is placed in close proximity to the transducers in order to reduce pickup or extraneous noise.

Figure 6:
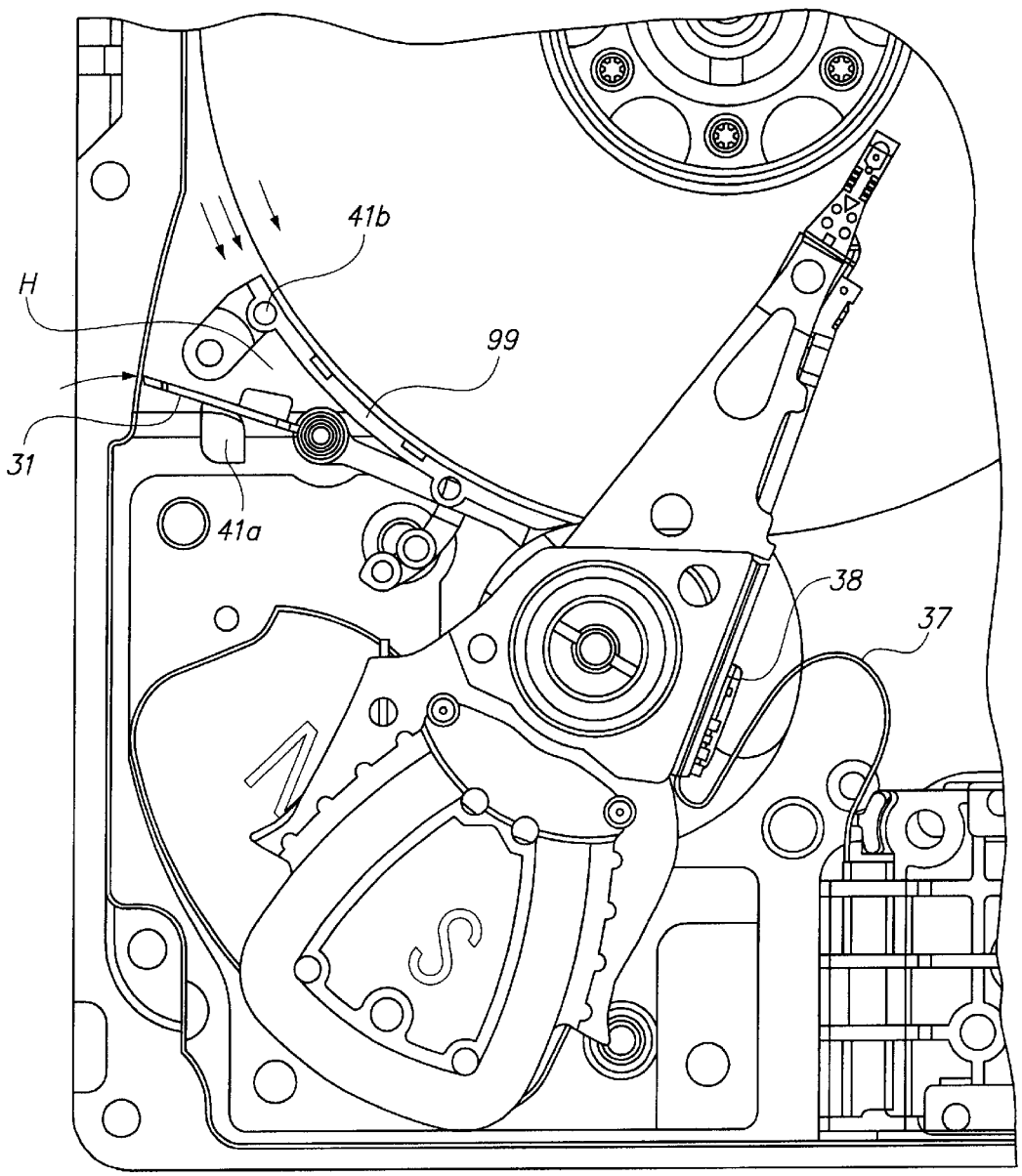
FIG. 6 is a magnified view of the latching mechanism, shown in an unlocked position.

To further understand the invention, operation of the latching mechanism 30 will now be discussed with reference to FIGS. 4a and 4b. Prior to the disk drive 40 being powered up, the transducer assembly 26 is parked in the landing zone 14 on the data storage disks 25, and the transducer actuator assembly 26 is latched in a locked position by the latching arm 32 being engaged with the transducer actuator 26, as shown in FIG. 4a. When power is applied to the spindle motor of the disk drive 40, the data storage disks 25 rotates in a counterclockwise direction as indicated by arrow A. As the rotating disks 25 reaches its optimum velocity of, for example, 7200 RPM, airflow is generated proximate to the surface of the disks 25 in a circular motion following the disks 25 rotation. As mentioned, peripheral effects from the airflow impinges against the air vane portion 31, creating a torque sufficient to overcome the magnetic bias, as discussed above, that rotates the latching mechanism 30 in the direction of arrow F about shaft 30a. As the latching mechanism 30 is "opened" and rotated against stop 41a a minimal gap is left between air vane portion 31 and side wall 46 such that airflow is substantially blocked. This substantial blockage of airflow creates an area of static high pressure, represented by H in FIG. 6, enabling the latching mechanism 30 to be maintained in this unlocked position until the disks 25 stop rotating.

The rotation of the latching mechanism 30 causes the latching arm 32 to release engagement with the transducer actuator assembly 26, allowing the transducer actuator assembly 26 bidirectional rotation as indicated by arrow B in FIG. 4a. This allows positioning of the transducer assembly 22 over various concentric data tracks on the surface of the disks 25.

When the disk drive device 10 is powered down, back EMF energy from the spindle motor is conventionally applied to the voice coil motor 36 of the transducer actuator assembly 26 to return the transducer assembly 22 to the landing zone 14 of the disks 25. Once the disks 25 reaches a low enough angular velocity, the airflow and the peripheral effects of the airflow, as well as the resulting static high pressure, fails to generate a force sufficient to overcome the magnetic bias. The latching mechanism 30 will rotate back to its locked position, re-engaging the latching arm 32 against the transducer actuator assembly 26, thereby securing the transducer actuator assembly 26 in the locked state.

The latching mechanism 30 of the present invention provides several advantages over the prior art latching mechanisms. First, there is no need for extraneous electronic controls because the latching mechanism 30 is based on airflow principles which inherently exist within the disk drive device 40. This leads to a second advantage of reduced power consumption over prior art vanes which do require such controls. A further advantage is that a disk drive device 40 employing the latching mechanism 30 of the present invention can be assembled in an easier and more cost efficient manner since there is no vane-to-disk merge operation. A still further advantage is that the latch mechanism 30 is positioned upstream relative the actuator assembly 26, on the relative opposite side as the flexible circuit 37. This arrangement further enables an easier and more cost efficient manner of assembly because this arrangement prevents the possibility of the latching mechanism 30 interfering with the flex circuit 37. Lastly, the present latching mechanism ensures that the transducer assembly remains in the landing zone 14, when the drive is non-operational, if subjected to rotational shock forces. That is, a clockwise rotational force will tend to keep the latching mechanism 30 in the locked position, since it opens in the counter clockwise direction. On the other hand, a counter clockwise rotational force may unlock the latching mechanism, but the force will also tend to keep the actuator assembly 26 within the landing zone 14. Thus, the present invention can provide an easy to assemble, reduced power, cost efficient and rotational shock resistant disk drive device.

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

What is claimed is:

1. A disk drive comprising:

a drive housing having a base and a sidewall;

a rotatable storage disk generates airflow during rotation, the storage disk having a peripheral edge;

an actuator assembly;

a latching mechanism including (i) a latching arm that moves between a locked position that limits movement of the actuator assembly and an unlocked position that does not limit movement of the actuator assembly, the latching arm being positioned on an upstream side of the actuator assembly, (ii) a vane portion coupled to the latching arm, at least a portion of the vane portion being positioned between the sidewall and the peripheral edge of the storage disk when the latching arm is in at least one of the positions, the vane portion moving the latching arm toward the unlocked position during rotation of the storage disk, and (iii) a latch baffle positioned near the vane portion, the latch baffle controlling airflow to the vane portion; and a stop that is fixedly connected to the base and secured to the latch baffle, the stop being positioned between the sidewall and the peripheral edge of the storage disk, the stop inhibiting the vane portion from contacting the storage disk.

2. The disk drive of claim 1 wherein the latching arm has a range of pivotal movement of at least approximately 35 degrees.

3. The disk drive of claim 1 wherein the latch baffle is positioned between the sidewall and the peripheral edge of the storage disk when the latching arm is in at least one of the positions.

4. The disk drive of claim 1 further comprising a bias that is secured to the latching arm, the bias urging the latching arm toward the locked position.

5. The disk drive of claim 4 wherein the actuator assembly includes a magnet having a magnetic field, and wherein the bias includes a pair of spaced apart, ferromagnetic members that interact with the magnetic field of the magnet.

6. The disk drive of claim 4 wherein airflow from the storage disk rotates the vane portion away from the storage disk, and in the absence of airflow, the bias rotates the vane portion toward the storage disk.

7. The disk drive of claim 1 wherein the vane portion is positioned between the sidewall and the peripheral edge of the storage disk when the latching arm is in the locked position and the unlocked position.

8. A disk drive comprising:

a drive housing having a base and a sidewall;

a rotatable storage disk that generates airflow during rotation, the storage disk having a peripheral edge;

an actuator assembly;

a latching mechanism including (i) a latching arm that moves between a locked position that limits movement of the actuator assembly and an unlocked position that does not limit movement of the actuator assembly, the latching arm being positioned on an upstream side of the actuator assembly, (ii) a vane portion coupled to the latching arm, at least a portion of the vane portion being positioned between the sidewall and the peripheral edge of the storage disk when the latching arm is in at least one of the positions, the vane portion moving the latching arm toward the unlocked position during rotation of the storage disk, and (iii) a latch baffle that is fixedly coupled to the drive housing and positioned near the vane portion, the latch baffle controlling airflow to the vane portion, the latch baffle being positioned between the sidewall and the peripheral edge of the storage disk when the latching arm is in the locked position; and a stop that is secured to the latch baffle, the stop inhibiting the vane portion from contacting the storage disk.

9. The disk drive of claim 8 wherein the latching arm has a range of pivotal movement of at least approximately 35 degrees.

10. The disk drive of claim 8 wherein the stop is positioned substantially between the vane portion and the storage disk.

11. The disk drive of claim 8 wherein the stop is fixedly coupled to the drive housing.

12. The disk drive of claim 8 further comprising a bias that is secured to the latching arm, the bias urging the latching arm toward the locked position.

13. The disk drive of claim 12 wherein the actuator assembly includes a magnet having a magnetic field, and wherein the bias includes a pair of spaced apart, ferromagnetic members that interact with the magnetic field of the magnet.

14. The disk drive of claim 12 wherein airflow from the storage disk rotates the vane portion away from the storage disk, and in the absence of airflow, the bias rotates the vane portion toward the storage disk.

15. The disk drive of claim 8 wherein the vane portion is positioned between the sidewall and the peripheral edge of the storage disk when the latching arm is in the locked position and the unlocked position.

16. The disk drive of claim 8 wherein the latch baffle is positioned between the sidewall and the peripheral edge of the storage disk when the latching arm is in the unlocked position.

* * * * *

UNITED STATES PATENT AND TRADEMARK OFFICE
CERTIFICATE OF CORRECTION

PATENT NO. : 6,704,168 B1
DATED : March 9, 2004
INVENTOR(S) : Michael et al.

It is certified that error appears in the above-identified patent and that said Letters Patent is hereby corrected as shown below:

Column 7,
Line 4, after "a rotatable storage disk" please insert the word -- that --.

Signed and Sealed this

Twenty-ninth Day of June, 2004

JON W. DUDAS
*Acting Director of the United States Patent and Trademark Office*